US012575501B2

(12) United States Patent　　　　　(10) Patent No.:　US 12,575,501 B2

Rathmer　　　　　　　　　　　　　　(45) Date of Patent:　　Mar. 17, 2026

(54) WINDROW PICKER WITH HOLD-DOWN DEVICES

(71) Applicant: DEERE & COMPANY, Moline, IL (US)

(72) Inventor: Mike Rathmer, Velen-Ramsdorf (DE)

(73) Assignee: DEERE & COMPANY, Moline, IL (US)

( * ) Notice: Subject to any disclaimer, the term of this patent is extended or adjusted under 35 U.S.C. 154(b) by 371 days.

(21) Appl. No.: 18/447,481

(22) Filed: Aug. 10, 2023

(65) Prior Publication Data

US 2024/0164257 A1　　May 23, 2024

(30) Foreign Application Priority Data

Nov. 21, 2022　(DE) .......................... 102022130747.6

(51) Int. Cl.
　　*A01D 89/00*　　　(2006.01)
　　*A01F 15/10*　　　(2006.01)
(52) U.S. Cl.
　　CPC ......... *A01D 89/004* (2013.01); *A01D 89/008* (2013.01); *A01F 15/10* (2013.01)
(58) Field of Classification Search
　　CPC .... A01D 89/004; A01D 43/06; A01D 89/008; A01D 89/001; A01D 89/002; A01D 41/10; A01F 15/10
　　See application file for complete search history.

(56) References Cited

U.S. PATENT DOCUMENTS

| | | | |
|---|---|---|---|
| 2,388,212 A | 10/1945 | Mcelhoe | |
| 2007/0119140 A1* | 5/2007 | Gette | ................... A01D 89/008 |
| | | | 56/364 |
| 2021/0274716 A1* | 9/2021 | Lammerant | .......... A01D 89/008 |
| 2022/0201937 A1* | 6/2022 | Breure | ................. A01D 78/146 |
| 2022/0408653 A1* | 12/2022 | Childs | .................. A01D 89/008 |

FOREIGN PATENT DOCUMENTS

| | | |
|---|---|---|
| DE | 10120124 A1 | 10/2002 |
| DE | 10120204 A1 | 1/2003 |
| DE | 102006001338 A1 | 7/2007 |
| DE | 102012011591 A1 | 12/2013 |
| EP | 0401542 A1 | 12/1990 |

(Continued)

OTHER PUBLICATIONS

Extended European Search Report and Written Opinion issued in European Patent Application No. 23206448.5, dated Apr. 4, 2024, in 14 pages.

*Primary Examiner* — Brad Harcourt

(57)　　　　　　　　ABSTRACT

A windrow picker is equipped with a supporting frame movable in a forward direction across a field. The frame having mounted thereon a pick-up drum, an output conveyor and a first rocker. The first rocker is mounted at its upper, rearward end on the frame so as to be pivotable about a transversely extending axis of rotation. A second rocker is hinged to the first rocker at the lower, front end of the first rocker at a mounting so as to be pivotable about a transversely extending axis. The second rocker supports a front, lower hold-down roller and a rear, upper hold-down roller. The lowest possible position of the second rocker is limited by a stop which cooperates with a counter stop. The counter stop is attached to the frame.

12 Claims, 2 Drawing Sheets

(56)     References Cited

FOREIGN PATENT DOCUMENTS

| EP | 0903077 | A1 | 3/1999 |
| EP | 1252814 | A1 | 10/2002 |
| EP | 1790206 | A1 | 5/2007 |
| EP | 2674023 | A1 | 12/2013 |
| EP | 4066624 | A1 | 10/2022 |

* cited by examiner

WINDROW PICKER WITH HOLD-DOWN DEVICES

CROSS-REFERENCE TO RELATED APPLICATIONS

This application claims the benefit of German Patent Application DE 102022130747.6, filed on Nov. 21, 2022, the disclosure of which is hereby incorporated by reference.

TECHNICAL FIELD

The disclosure generally relates to a windrow picker and a harvesting machine equipped with the windrow picker.

BACKGROUND

Windrow pickers are used in agriculture to pick up crop, which is lying in a field and which has usually been previously dried and laid in a swath, and feed it to a harvesting machine, where it may be pressed into a bale (e.g., a baler implement), loaded for transport (e.g., onto loader wagon), chopped (e.g., a forage harvester) or threshed (e.g., a combine harvester). Such windrow pickers usually comprise a pick-up drum with tines attached to tine carriers extending transversely to the forward direction. The tine carriers are set in motion by rotating a holder that supports them. The tines extend outward through spaces remaining between scrapers attached to the framework of the windrow picker and move along these spaces. The tine carriers can be controlled by cam tracks (U.S. Pat. No. 2,388,212 A) so that the angular position of the tine carriers changes during rotation so as to be able to accept the crop produce as aggressively as possible and retract into the interior of the strippers at the delivery point, or they can be uncontrolled, i.e. rigidly connected to the holder (EP 0 903 077 A1). Downstream of the pick-up drum, there usually follows a cross-feeding auger or another output conveyor, which feeds the crop produce to the harvesting machine, where it is further processed (cut) or collected or pressed Above the collection drum, there is usually a hold-down device, the function of which is to press the swath against the ground in order to pre-compact it, and/or to form an upper boundary for the crop produce conveyed by the pick-up drum. These hold-down devices can be designed as rollers, plates or tine rakes.

For example, EP 1 790 206 A1 presents a windrow picker in which a front hold-down roller cooperates with the swath in front of the pick-up drum and is rotatably attached to a swivel arm at each of its two ends. The swivel arms are hinged at their rear end to the rear, upper end of the framework of the windrow picker so as to be rotatable about the transverse axis. The front hold-down roller presses the crop produce against the ground and is intended to pre-compact it. It moves upwards together with the swivel arms, depending on the swath height. A rear hold-down roller is mounted above the pick-up drum to form an upper boundary for the crop produce conveyed by the pick-up drum, and is supported at the end on rockers that are hinged to the swivel arms coaxially with the axis of rotation of the front hold-down roller. The rocker with the rear hold-down roller can rotate about the axis of rotation of the front hold-down roller and deflect upwards depending on the swath height. To achieve a minimum distance between the rear hold-down roller and the enveloping circle of the tines of the pick-up drum, a lower stop for the rockers is provided on the swivel arms. A similar arrangement, but with an elongate bar grate instead of the rear hold-down roller, is shown in DE 101 20 124 A1.

The result of this arrangement is that the front hold-down roller also lifts the rear hold-down roller as soon as the front hold-down roller is lifted by the swath. As a result, the rear hold-down roller moves upwards—at the start of the swath or if there are larger crop accumulations in the swath—even if the crop produce has not yet arrived at the rear hold-down roller. In these cases, the crop produce above the pick-up drum lacks an upper boundary and a free space is created, in which the crop produce is not conveyed. Larger accumulations of crop produce then form, which may lead to a jam that must be cleared by stopping and reversing or manually.

Similar arrangements with front and rear hold-down rollers that are jointly supported on a rocker, which in turn is hinged in a forwardly offset manner relative to the front hold-down roller with respect to the framework of the windrow picker, are shown in the generic publications EP 0 401 542 A1 and DE 101 20 204 A1. There, the problem discussed in the previous paragraph occurs to an even greater extent, since the rear hold-down roller moves upward to an even greater extent than the front hold-down roller due to the lever transmission of the rocker.

Lastly, DE 10 2012 011 591 A1 shows a windrow picker with a rear hold-down roller that is supported on rear rockers that are hinged to the framework of the windrow picker coaxially to the axis of rotation of the cross-feeding auger. The lowest possible position of the rear rockers and thus of the rear hold-down roller is defined by adjustable stops on the framework, against which the rear rockers come to rest when there is no crop flow. Front rockers are hinged to the rear rockers so as to be rotatable about the transverse axis, offset forwards and downwards relative to the axis of rotation of the rear hold-down roller, and rotatably support a front hold-down roller on their front side. The range of rotation of the front rockers relative to the rear rockers is limited by adjustable stops at the bottom and top. This also gives rise to the problem discussed above and explicitly addressed in DE 10 2012 011 591 A1, namely that when the swath height suddenly increases (when the front rockers come to the upper stop), the rear rocker and with it the rear hold-down roller are also lifted by the front hold-down roller, and above the windrow picker the boundary of the crop flow by the rear hold-down roller is missing, leading to flow problems and crop jams.

SUMMARY

A windrow picker is provided. The windrow picker is equipped with a supporting frame movable in a forward direction across a field. The frame having mounted thereon a pick-up drum, an output conveyor and a first rocker. The first rocker is mounted at its upper, rearward end so as to be pivotable about a transversely extending axis of rotation. A second rocker is mounted on the first rocker at the lower, front end of the first rocker at a mounting so as to be pivotable about a transversely extending axis. The first rocker or the second rocker support a front, lower hold-down element (in particular a rotatable hold-down roller, but it can also be a plate or a bar screen or the like) and the second rocker supports a rear, upper hold-down element (in particular a rotatable hold-down roller, but it can also be a plate or a bar screen or the like). The lowest possible position of the second rocker is limited by a stop which cooperates with a counter stop which is attached to the frame.

In this way, the disadvantages mentioned at the outset are avoided, because the second rocker with the rear, upper hold-down element does not necessarily move upwards to a greater extent due to the changed position of the counter stop when the first rocker is lifted by the front, lower hold-down element as the swath height increases, but to a lesser extent than in the prior art. Nevertheless, a certain coupling between the two hold-down elements can be achieved by the second rocker, so that the second hold-down element is already lifted to a suitable, albeit smaller, extent than before when the swath height increases.

In one aspect of the disclosure, the stop may be located adjacent the upper, rear end of the second rocker.

In one aspect of the disclosure, the stop can rest on the flat counter stop from above to allow rotational and sliding movement between the stop and the counter stop. The stop may be rod-shaped, e.g., cylindrical, and extend transverse to the forward direction. However, other arrangements are possible to allow movement of the stop relative to the mating fence in the horizontal direction (forward and rearward) and upward and downward.

In one aspect of the disclosure, a further stop can be provided on the first rocker and interacts with the stop when the second rocker is deflected forwards and upwards with larger crop throughputs at the rear, upper hold-down element.

In one example implementation, the first and second rockers are arranged on both sides of the frame and one second rocker each is hinged to each first rocker so as to be rotatable about the axis of rotation. The hold-down elements or hold-down rollers extend between the two second rockers, at least one (or both) of which is or are equipped with the stop.

In one aspect of the disclosure, the windrow picker can be used on different configurations of harvesting machines, e.g., self-propelled, towed, attached. In particular, the windrow picket may be used on forage harvesters, loader wagons, balers or combine harvesters.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figures 1, 2:
FIG. 1 is a side view of a forage harvester with a windrow picker.
FIG. 2 is a side view of the windrow picker with a front hold-down roller and a rear hold-down roller in respective lowest positions.

Referring to the Figures, wherein like numerals indicate like parts throughout the several views, a harvesting machine is generally shown at 10. Referring to FIG. 1, the harvesting machine 10 is configured as a self-propelled forage harvester 10. However, it should be appreciated that the harvesting machine 10 may be configured differently than the example forage harvester shown in the figures and described herein. The forage harvester 10 is built on a framework 12 supported by front driven wheels 14 and steerable rear wheels 16. The forage harvester 10 is operated from a driver's cab 18, from which a harvesting attachment in the form of a windrow picker 20 is visible. Crop produce, such as grass or the like, picked up from the ground by means of the windrow picker 20 is fed to a chopping drum 22 via an intake conveyor with pre-press rollers 30 arranged within an intake housing 50 on the front side of the forage harvester 10, which chopping drum chops the crop into small pieces and feeds it to a discharge accelerator 24. The crop exits the forage harvester 10 to a trailer, traveling alongside, via a discharge elbow 26 that is rotatable about an approximately vertical axis and is adjustable in inclination. Between the chopping drum 22 and the conveyor device 24 there extends a secondary comminution device 28 having two grain processor rollers through which the crop to be conveyed is fed, tangentially, to the conveyor device 24. The secondary comminution device 28 is particularly needed during corn harvesting to strike grains, and is removed or moved to an ineffective open position during grass harvesting.

The windrow picker 20 is designed as a so-called pick-up. The windrow picker 20 is mounted on a frame 32 and is supported (at least partially) on the ground by means of support wheels 38 mounted on both sides, each of which wheels is attached to the frame 32 by means of a carrier 46. The task of the windrow picker 20 is to pick up crop produce scattered on the ground of a field or deposited in a swath 58 and to feed it to the harvesting machine 10 for further processing. For this purpose, the windrow picker 20 is moved over the field at a small distance from the ground during harvesting operation, while for transport on a road or on paths it is raised by means of a hydraulic cylinder 48, which pivots the intake housing 50 and the windrow picker 20 attached thereto about the axis of rotation of the chopping drum 22. The hydraulic cylinder 48 is also used to adjust the height of the windrow picker 20 above the ground, or to adjust the contact pressure of the support wheels 38 on the ground.

The windrow picker 20 includes a cross-feeding auger 36 in the form of a screw conveyor that conveys the picked-up crop from the sides of the windrow picker 20 to a discharge opening (not shown) located in the center, behind which the intake conveyor with the pre-press rollers 30 follows. The windrow picker 20 also has a rotationally driven pick-up drum 34 (like the output conveyor 36), which is arranged below the output conveyor 36 and lifts the crop from the ground with its tines in order to transfer the crop to the output conveyor 36. The pick-up drum 34 can be of any design, i.e. can be provided with controlled or uncontrolled tines and arranged within a housing with scrapers, or the housing can be omitted. One possible embodiment of the pick-up drum 34 is shown in DE 10 2006 001 338 A1, the disclosure of which is incorporated by reference into the present documents, although the scrapers could be attached in any manner other than as shown therein.

In the following text, direction indications, such as sideways, downwards and upwards, relate to the forward movement direction V of the windrow picker 20, which is to the left in the figures.

The windrow picker 20 includes a lower, front hold-down roller 44 and an upper, rear hold-down roller 52. First rockers 40 extend arcuately on both sides of the windrow picker 20 from their front, lower ends upwardly and rearwardly and are supported in the upper, rear region of the windrow picker 20 on pivot axles 42 on the frame 32 of the windrow picker 20 so as to be pivotable about the transverse axis. Near the lower ends of the first rockers 40, second rockers 46 are hinged by mountings 60 (cf. also FIG. 3), which again extend obliquely upwards and rearwards. At the rearward, upper end of the second rockers 46, bar-shaped stops 50 extending transversely outward are provided on both sides of the windrow picker 20 and from above rest on flat counter stops 54, which in turn are fastened to the frame 32. The lower, front hold-down roller 44 is rotatably mounted on the second rockers 46 at the lower end, and the upper, rear hold-down roller 52 is rotatably mounted in the upper region. The rockers 40, 46 are thus rotatably mounted about the transverse axis on the axes of rotation 42 and the mountings 60, respectively, which applies analogously to the hold-down rollers 44 and 52 extending in the transverse direction between the second rockers 46 and rotatably mounted on the second rockers 46.

Figures 3, 4, 5:
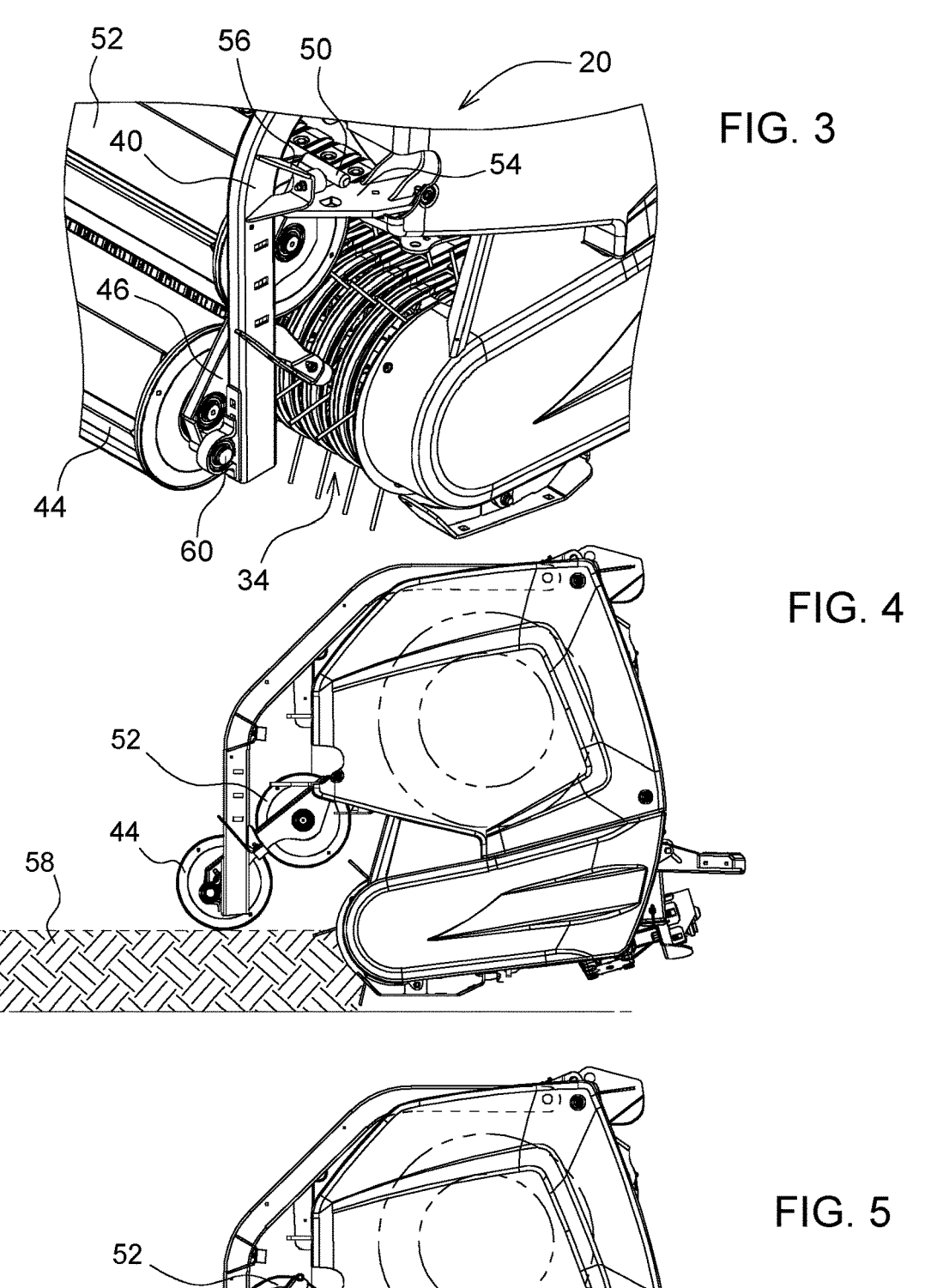
FIG. 3 is an enlarged perspective detail view from FIG. 2.
FIG. 4 is the side view of the windrow picker according to FIG. 2 but with the front hold-down roller raised due to increasing crop flow.
FIG. 5 is the side view of the windrow picker according to FIG. 4 showing when crop flow has also reached the rear hold-down roller.

The downward rotation of the first rockers 40 is limited by adjustable or non-adjustable stops (which may be formed, for example, between the front side of the counter stops 54 and the adjacent region of the first rockers 40, or by other regions or elements, fixed thereto, of the first rockers 40, abutting against the frame 32), which applies analogously to the second rockers 46 with their stops 50 abutting against the counter stops 60, so that, in the absence of crop flow, the positions of the rockers 40, 46 and hold-down rollers 44, 52 as shown in FIGS. 2 to 3 are obtained. The lower, front hold-down roller 44 is thus in a position in front of the pick-up drum 34 and above the swath 58 to be picked up, so that said roller pre-compacts the swath 58 with respect to the ground and/or forms a front boundary for the crop flow picked up by the pick-up drum 34. Similarly, the upper, rear hold-down roller 52 forms a boundary for the crop flow picked up by the pick-up drum 34 in a diagonally forward and upward direction before it is picked up by the output conveyor 36.

As the height of the crop mat in the swath 58 increases, the front lower hold-down roller 44 is raised (cf. FIG. 4) and the first rockers 40 rotate upwards about the axis of rotation 42. This situation is shown in FIG. 4. As long as the crop flow has not yet arrived at the rear, upper hold-down roller 52, the second rockers 46 rotate only slightly about the mounting 60 relative to the first rockers 40, while the stop 50 rotates relative to the counter stop 50 and moves slightly forward. The rear, upper hold-down roller 52 also moves forward and upward only slightly, as shown in FIG. 4. This is due to the positioning of the rear, upper hold-down roller 52 on the second rocker 46 and the positioning of the stop 50 relative to the frame 32 above and rearward of the rear, upper hold-down roller 52, which results in a reduction in the movement of the first rocker 40 relative to the rear, upper hold-down roller 52. This avoids the crop flow problems that arise in the prior art.

When the increased crop flow reaches the rear, upper hold-down roller 52, the latter also moves upwards and forwards, i.e., the second rocker 46 rotates about the axis of rotation 60 and the stop 50 lifts off from the counter stop 54, as shown in FIG. 5. In the case of larger crop throughputs and consequent movement of the rear, upper hold-down roller 52, the stop 50 can come into contact with a further stop 56 (formed in the embodiment shown, for example, by a bracket connected to the first rocker 40 and a rubber buffer attached thereto and facing the stop 50), which is arranged on the first rocker 40, and can lift it as well. In this case, the lower, front hold-down roller 44 is also moved forwards and upwards.

The hold-down rollers 44 and 52 may rotate freely or may be connected to drives to drive them at a peripheral speed at least approximately equal to the forward speed of the forage harvester 10, counter-clockwise in the figures. The rockers 40, 46 may be pulled downwardly by weight force alone, or active or passive elements may be provided to bias them downwardly or upwardly.

In another embodiment, not shown in the figures, the lower, front hold-down roller 44 may not be mounted on the second rocker 46, but may be mounted on the first rocker 40 near the lower front end of the first rocker 40, in particular coaxially with the axis of rotation of the second rocker 46. Further, the lower, front hold-down roller 44 and/or the second, upper hold-down roller 52 could be replaced or supplemented by another hold-down element, such as a flat plate or a tine rake.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A windrow picker for attachment to a harvesting machine, the windrow picker comprising:

a supporting frame operable to move in a forward direction across a field;

a pick-up drum mounted to the supporting frame;

an output conveyor mounted to the supporting frame;

a first rocker pivotably mounted to the supporting frame for rotation about a transversely extending respective axis of rotation at an upper rearward end of the first rocker relative to the forward direction;

a second rocker mounted to the first rocker at a mounting for rotation about a transversely extending respective axis of rotation at a lower front end of the first rocker relative to the forward direction;

wherein one of the second rocker and the first rocker supports a front lower hold-down element;

wherein the second rocker supports a rear upper hold-down element; and wherein the lowest possible position of the second rocker is limited by a stop which cooperates with a counter stop attached to the supporting frame to limit downward rotation about the transversely extending axis of rotation of the second rocker about the mounting of the second rocker to the first rocker.

2. The windrow picker set forth in claim 1, wherein the stop is arranged adjacently to the upper rearward end of the second rocker relative to the forward direction.

3. The windrow picker set forth in claim 2, wherein the stop rests on the counter stop from above to allow rotational and sliding movement between the stop and the counter stop.

4. The windrow picker set forth in claim 3, wherein the stop is cylindrical and extends transversely relative to the forward direction.

5. The windrow picker set forth in claim 3, further comprising a further stop disposed on the first rocker for interaction with the stop when the second rocker is deflected forwards and upwards by the rear upper hold-down element.

6. The windrow picker set forth in claim 1, wherein the first hold-down element is one of a rotatable hold-down roller, a flat plate or a tine rake, and the second hold-down element is one of a rotatable hold-down roller, a flat plate or a tine rake.

7. A windrow picker for attachment to a harvesting machine, the windrow picker comprising:

a supporting frame operable to move in a forward direction across a field;

a first rocker pivotably mounted to the supporting frame for rotation about a transversely extending respective axis of rotation at an upper rearward end of the first rocker relative to the forward direction;

a second rocker mounted to the first rocker at a mounting disposed at a lower front end of the first rocker relative to the forward direction, wherein the second rocker is rotatable relative to the first rocker about a transversely extending respective axis of rotation;

wherein one of the second rocker and the first rocker supports a front lower hold-down element;

wherein the second rocker supports a rear upper hold-down element positioned vertically above and rearward of the front lower hold-down element relative to the forward direction;

wherein the second rocker includes a stop; and wherein the supporting frame includes a counter stop positioned to engage the stop at a lowest possible position of the second rocker.

8. The windrow picker set forth in claim 7, wherein the stop rests on the counter stop from above to allow rotational and sliding movement between the stop and the counter stop.

9. The windrow picker set forth in claim 7, wherein the stop is arranged adjacently to an upper rearward end of the second rocker relative to the forward direction.

10. The windrow picker set forth in claim 7, wherein the stop is cylindrical and extends transversely relative to the forward direction.

11. A harvesting machine comprising:

a supporting frame operable to move in a forward direction across a field;

a first rocker pivotably mounted to the supporting frame for rotation about a transversely extending respective axis of rotation at an upper rearward end of the first rocker relative to the forward direction;

a second rocker mounted to the first rocker at a mounting disposed at a lower front end of the first rocker relative to the forward direction, wherein the second rocker is rotatable relative to the first rocker about a transversely extending respective axis of rotation;

wherein one of the second rocker and the first rocker supports a front lower hold-down element;

wherein the second rocker supports a rear upper hold-down element positioned vertically above and rearward of the front lower hold-down element relative to the forward direction;

wherein the second rocker includes a stop; and wherein the supporting frame includes a counter stop positioned to engage the stop at a lowest possible position of the second rocker to limit downward rotation about the transversely extending axis of rotation of the second rocker about the mounting of the second rocker to the first rocker, wherein the stop rests on the counter stop from above to allow rotational and sliding movement between the stop and the counter stop.

12. The harvesting machine set forth in claim 11, wherein the stop is arranged adjacently to an upper rearward end of the second rocker relative to the forward direction.

* * * * *